(12) United States Patent
Lawrence

(10) Patent No.: US 6,382,021 B1
(45) Date of Patent: May 7, 2002

(54) APPARENT WIND INDICATOR

(76) Inventor: Lloyd L. Lawrence, 2050 W. 7th Ave., Denver, CO (US) 80204

( * ) Notice: Subject to any disclaimer, the term of this patent is extended or adjusted under 35 U.S.C. 154(b) by 0 days.

(21) Appl. No.: 09/305,589

(22) Filed: May 5, 1999

(51) Int. Cl.[7] .............................................. A63B 53/00
(52) U.S. Cl. ................................................... 73/170.01
(58) Field of Search .............................. 73/170.01, 188, 73/189, 170.05

(56) References Cited

U.S. PATENT DOCUMENTS

| | | | |
|---|---|---|---|
| 1,068,169 A | 7/1913 | Ricketts | |
| 1,336,925 A | 4/1920 | Sakauye | |
| 1,911,169 A | 5/1933 | Trogner | |
| 2,075,424 A | 3/1937 | Bull | |
| 4,152,933 A | * 5/1979 | Woodhouse | 73/189 |
| 4,314,477 A | 2/1982 | Yancy | |
| 4,561,301 A | * 12/1985 | Steele | 73/188 |
| 5,127,358 A | * 7/1992 | Galloway et al. | 116/265 |
| 5,808,193 A | 9/1998 | Syska et al. | |
| 6,069,409 A | * 5/2000 | Fowler et al. | 290/55 |

FOREIGN PATENT DOCUMENTS

GB          2036333          6/1980

* cited by examiner

Primary Examiner—Benjamin R. Fuller
Assistant Examiner—Jewel Thompson
(74) Attorney, Agent, or Firm—Ramon L. Pizarro; Edwin H. Crabtree

(57) ABSTRACT

An indicator device for aiding a cyclist in locating a desired location for drafting another cyclist. The indicator device includes a support adapted for mounting the device against a bicycle, a vane having surfaces for alignment with the wind, the vane being pivotally mounted on the support, and a vane position orientation indicator. The vane orientation indicator being connected to the vane, so that the orientation of the vane relative to the bicycle is detected with reference to the vane orientation indicator.

20 Claims, 4 Drawing Sheets

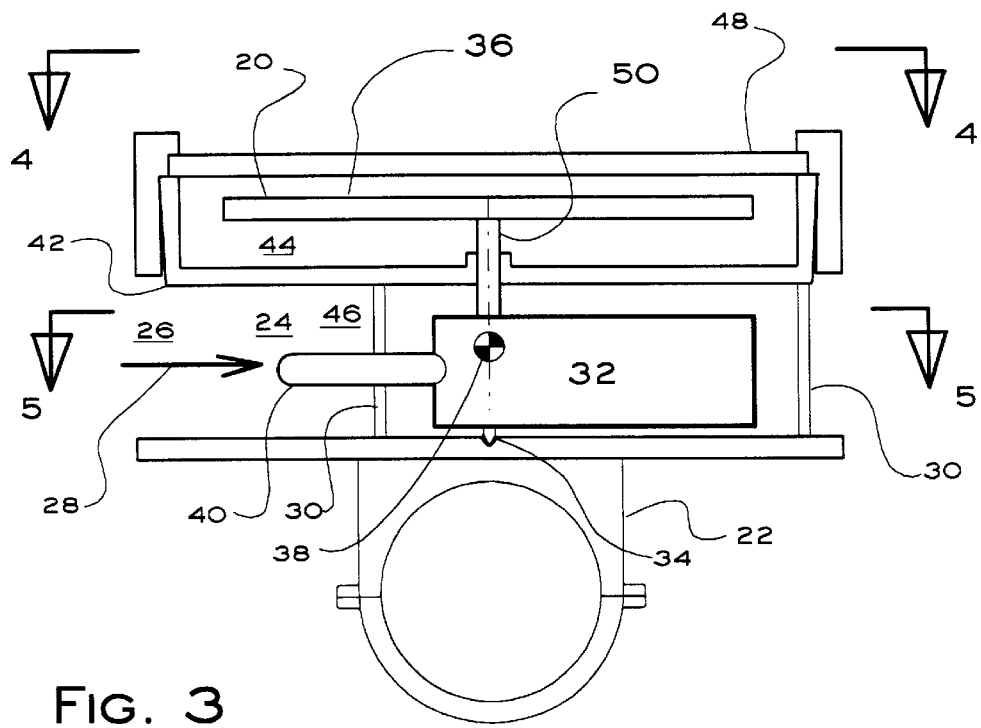
FIG. 3
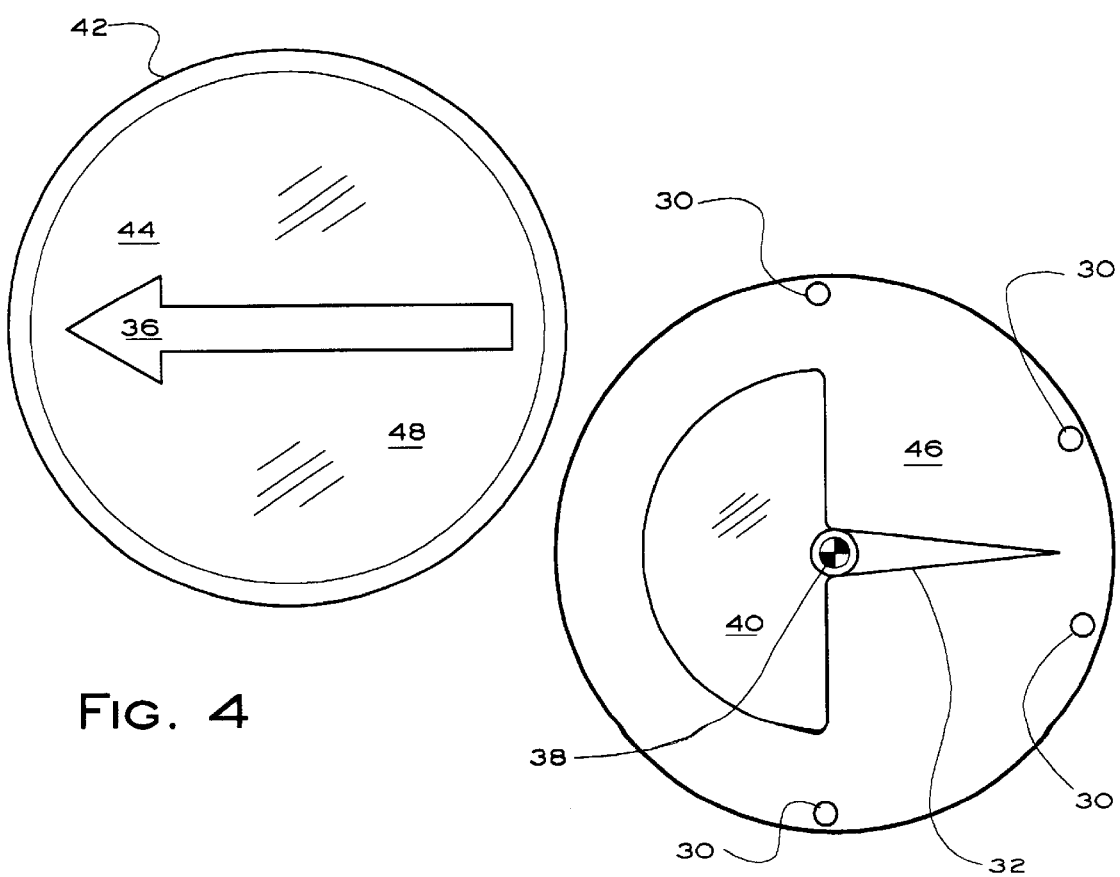
FIG. 4
FIG. 5

APPARENT WIND INDICATOR

BACKGROUND OF THE INVENTION (a) Field of the Invention

This invention generally relates to a device and system for determining the direction from where the apparent wind is approaching an individual. More particularly, but not by way of limitation, to an enclosed or protected apparent wind indicator which is mountable on a bicycle and which allows the user to determine the optimal location to draft relative to a leading cyclist.

(b) Known Art

In the sport of bicycling it is well known that it is advantageous to draft other riders in order to minimize the amount of energy used by a rider in overcoming wind drag resistance. The precise optimal location at which the drafting rider must position himself relative to the leading rider or rider being drafted is often difficult to establish.

Apparent wind, the wind strength direction as experienced by a moving body, is the vectoral summation or resultant of the true wind and the relative wind felt by body due to the fact that the body is moving. Apparent wind indicators have been in use in the sport of sailing and other nautical applications for many years. Nautical apparent wind indicators are typically relatively large devices which are mounted at a location where undisturbed apparent wind measurements can be taken. Thus, it is common to find a boat's apparent wind indicator mounted at the top of a mast, along one of the stays, shrouds, or other lines on a boat.

In the sport of cycling, however, the rider or participant encounters conditions which are quite different from the conditions encountered in sailing. Perhaps one of the most prominent differences is that the sailboat allows the positioning of the apparent wind indicator at a location where it is highly unlikely to be interfered with. Thus, the common nautical wind indicator will typically include an open frame with a wind sock type pointer pivotally mounted on the open frame. Such an arrangement, unfortunately, would be virtually useless in the field of cycling, where the equipment must be able to work in close proximity to the rider, and thus must be resistant to bumping or contact with the rider. Moreover, it is preferred that each piece of cycling equipment be an independent system that is enclosed or encapsulated such that the device may be removed and positioned on the bicycle by simply attaching a mounting support to the bicycle.

A review of known devices that are useful as apparent wind indicators, or indicators for displaying the direction of fluid flow will reveal U.S. Pat. No. 5,808,193 to Syska et al. The Syska invention includes a shaft with a rudder at one end and a pennant on the other end. The shaft is pivotally supported by a support tube which allows mounting of the Syska device against the side of a dock or the like. The Syska device provides boaters with a means for determining the direction of water current flow below the surface near a dock. The Syska device provides a useful tool for boaters, but provides little guidance as to how to create a wind indicator for cyclists. Other nautical apparent wind or current direction indicators can be found in U.S. Pat. No. 4,314,477 to Yancy U.S. Pat. No. 1,336,925 to Sakauye.

U.S. Pat. No. 4,561,301 to Steele teaches the use of a small wind sock mounted on the handlebar of a bicycle. The use of this small wind sock to determine apparent wind serves well as a novelty item, but is likely to prove to be somewhat of a nuisance to the serious cyclist who needs a device that resists the effects of rain, for example, and which can function without requiring the a large amount of room or space on the front of the bicycle to work without interference from the rider.

Other known devices include U.S. Pat. No. 2,075,424 to Bull, which teaches a wind speed indicator for bicycles and U.S. Pat. No. 1,911,169 to Trogner which teaches a combined wind speed indicator and wind sock for use next to runways.

A review of known devices reveals that there remains a need for a self contained apparent wind indicator for use in cycling. More particularly, there remains a need for a simple, self contained device that can be used by bicyclists for determining the optimal location from where to draft a leading rider.

Thus, it will be appreciated that there remains a need for a simple, effective device for determining the direction of apparent wind, the device being capable of tolerating the interference of the elements, the changing inclination of the terrain, and the constant jolting experienced while riding a bicycle.

Still further, there remains a need for a robust device that helps bicycle riders determine where to position themselves relative to a leading rider in order to gain the greatest benefits of drafting the leading rider.

SUMMARY

It has been discovered that the problems left unanswered by known art can be solved by providing an indicator device for aiding cyclists in locating a desired alignment location for drafting another cyclist, the device includes:

1) a housing that includes a compartment which permits air flow through the compartment;
2) a vane pivotally mounted within the compartment; and
3) a display system which displays the orientation of the vane relative to the housing, so that the desired alignment location for drafting other cyclists is indicated by the display system which indicates the orientation of the vane.

According to a highly preferred embodiment of the invention the housing of the indicator device includes an upper compartment and a lower compartment. The upper compartment encloses the display system, while the lower compartment encloses the vane. The housing will preferably include a mechanism for supporting the entire indicator device from a bicycle handlebar or other component of the bicycle structure.

In operation, the indicator device will preferably be mounted on the handlebars of the bicycle. Mounting the indicator device at this location will allow the rider to view the display system and the alignment position that the rider should take relative to another cyclist in order to gather the optimal benefit of drafting of the other cyclist. In a highly preferred embodiment, the display system includes a needle which is mounted within the upper compartment such that the rider may view the needle. The needle is in turn connected to the vane by a shaft or the like. This arrangement allow the rider to easily view the needle while riding; the needle reflecting the position of vane, which has aligned itself with the air flowing through the lower compartment.

While it is contemplated that the needle will be connected to the vane by a mechanical component, it is also contemplated that the needle may be created by way of an Liquid Crystal Display (LCD) which is connected to an electronic circuit which relates the position of the vane to the LCD. This type of system could include position marking conductors to send an electrical signal that corresponds to the position of the vane. This signal is then converted to a signal that allows the LCD display to create an image indicating the preferred position for alignment. The electronic circuitry to determine and relate the position of the vane and create the display on the LCD is well known and will not be discussed in greater detail.

In order to produce a simple and robust indicator apparatus, it is contemplated that the vane will pivotally supported about an axis that extends through the center of gravity of the vane. In one embodiment this is achieved by providing a vane in which a portion of the vane with a large surface area that is acted on by the wind is included on one side of the axis and a counterweight is provided on the opposite side of the axis. Additionally, it is contemplated that the side of the vane with the large surface are and said vane further comprising a wind alignment section and a counterbalance weight for positioning the center of gravity of the vane along the axis of support. In one embodiment it is contemplated that the counterbalance weight may be provided by a flat, generally planar section that is positioned in a generally normal position relative to the wind alignment section of the vane. The use of the counterbalance weight will allow the position of the vane to be insensitive to changes in the angle or position of the invention. Thus, the use of the counterbalance weight will produce a device which responds to changes in air currents rather than changes in the orientation of the device.

Furthermore, it is contemplated that the lower compartment of the invention will provide a relatively unobstructed air flow route or path, such that the air currents experience thought the lower compartment are representative of the apparent wind experience by the rider.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWING

The accompanying drawings illustrate preferred embodiments of the present invention according to the best mode presently devised for making and using the instant invention, and in which:

FIG. 3 is a side sectional view of a highly preferred embodiment of the invention.

FIG. 4 is a top view of the embodiment illustrated in FIG.3, the view taken in the direction illustrated in FIG. 3.

FIG. 5 is a sectional view of the embodiment illustrated in FIG.3, the view taken in the direction illustrated in FIG. 3.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figures 1, 2:
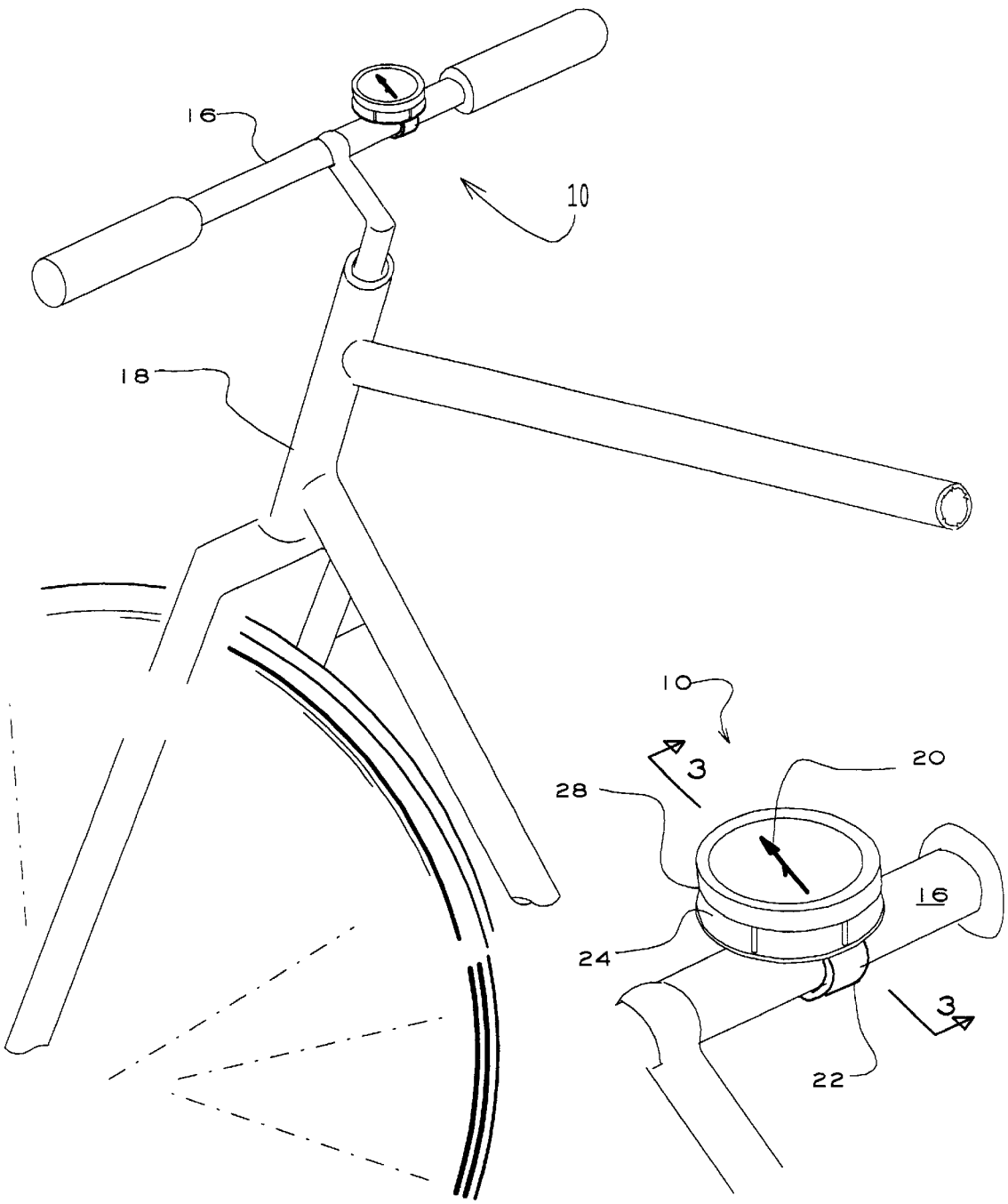
FIG. 1 is a perspective view of a highly preferred embodiment of the invention.
FIG. 2 is a perspective view of the embodiment illustrated in FIG. 1.
Figure 1A:
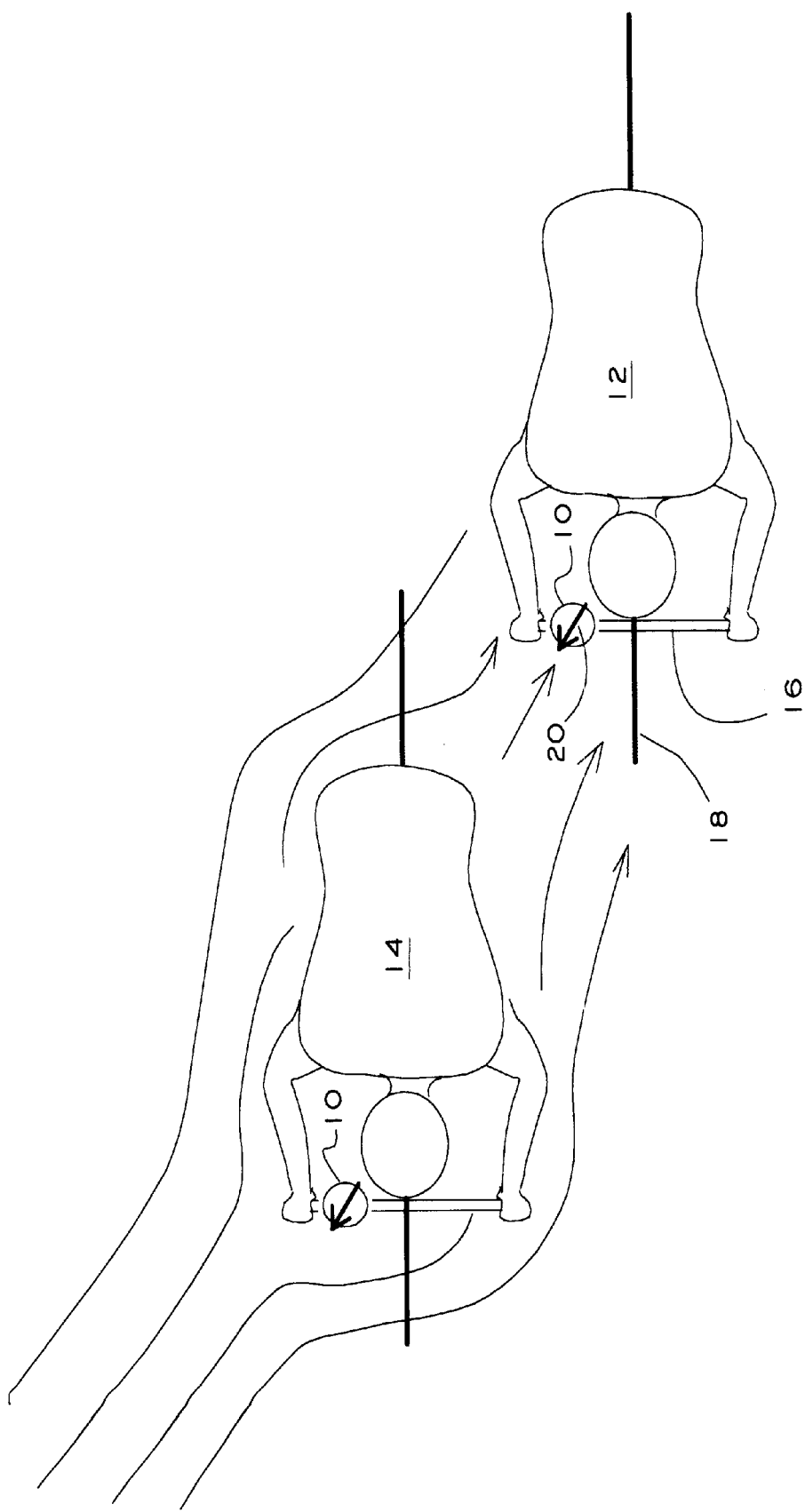
FIG. 1A is a plan view of the disclosed invention while drafting.

Turning now to FIGS. 1, 1A and 2 where an indicator device 10 for aiding a cyclist 12 in finding the ideal location drafting another cyclist 14. As shown on FIG. 1A, the indicator device 10 allows that user or cyclist 12 to determine and locate the direction of the apparent wind experienced near the other cyclist 14. Drafting, or the positioning of the moving cyclist 12 behind moving cyclist 14 in order to allow cyclist 14 shield cyclist 12 from prevailing wind currents and corresponding aerodynamic drag forces. The wind or aerodynamic drag experienced by cyclist 12 is a function of the prevailing atmospheric wind and the wind "created" by the fact that the cyclist is moving. Riding behind the leading cyclist 14 shields cyclist 12 from the wind, and thus the amount of wind drag on the cyclist 12 varies depending on his or her position relative to rider 14. If rider 12 is too far back, behind rider 14, she is likely to experience the true wind, which is the wind created by the atmospheric conditions, and the wind drag created by the fact that she is moving. Also, if rider 12 is close to rider 14, but at a position which does not adequately shield rider 12 from the true wind.

As shown on FIG. 1A, the disclosed indicator device 10 will preferably be mounted on the handlebars 16 of a user's bicycle 18. The indicator device 10 will include an indicator 20 will allow the user to determine the optimal location at which to position himself relative to another rider in order to draft the leading rider. For example, on FIG. 1A the indicator 20 is pointing to the leading cyclist 14, letting the rider 12 know that he is at the optimal position relative to cyclist 14 to draft cyclist 14.

Referring now to FIGS. 2 and 3 it will be understood that it is preferred that the indicator device 10 will be mounted on the bicycle with the aid of a support means 22 which adapted for mounting the indicator device 10 against the bicycle 18. It is important to note that while the illustration includes a clamp type support means 22, it is also contemplated that these support means may include a brace or bracket that fastens directly to the frame of the bicycle 18. The indicator device includes a compartment 24 which includes aperture 26 or a passage that allows air passage through the compartment 24 as indicated by arrow 28. The aperture 26 or passage is created by support posts 30 that are mounted next to a vane 32. The vane 32 is mounted on a pivot type support 34 which allows the vane to rotate in response to air flow through the compartment 24, such that the vane aligns itself with the direction of the air flow traveling through the compartment 24.

The vane 32 will preferably include high frontal area surfaces 36 that will cause the vane 32 to align itself with the wind or airflow thought the compartment 24. The position of the vane 32 relative to the compartment 24 will correspond to a direction of flow of air through the compartment 24. The direction of flow of air through the compartment 24 causes the vane 32 to align itself with the direction of the flow. Thus in a highly preferred embodiment of the invention, an orientation indicator means which informs the rider of the position of the vane relative to the compartment 24. In one embodiment, it is envisioned that the orientation indicator means includes an electronic position sensing means, which may simply be a plurality of conductor leads or optical sensors. For example, it is well known that photoelectric cells may be used to determine the position of an opaque article. Once the opaque article, for instance the vane 32, covers the photoelectric cell the cell stops sending an electric current. This interruption on the electric current may then be used as a signal to control an LED screen which provides the rider with indicia that indicated the direction of the apparent wind as it strikes the vane 32.

As shown in FIG. 3 a highly preferred embodiment includes a needle 36 that is mechanically connected to the vane 32, so that the orientation of the vane 32 relative to the compartment 24, and hence the bicycle 18, is detected by the orientation of the needle 36.

Figure 6:
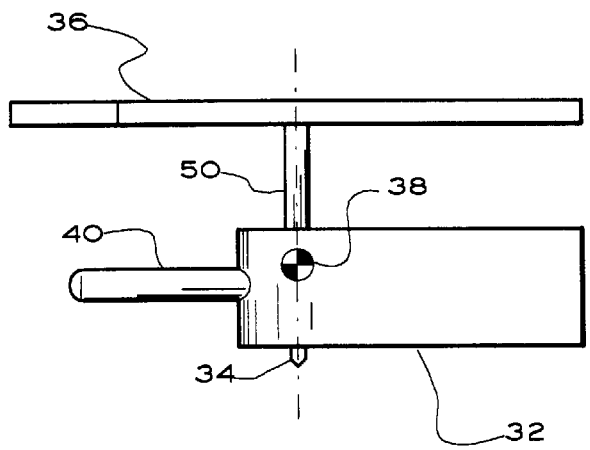
FIG. 6 is side view of an embodiment of the vane used with the invention.
Figure 7:
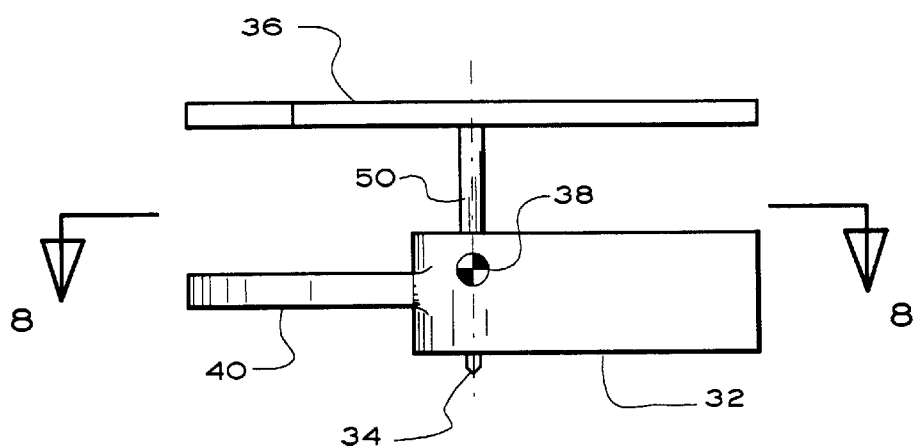
FIG. 7 is side view of an embodiment of the vane used with the invention.
Figure 8:
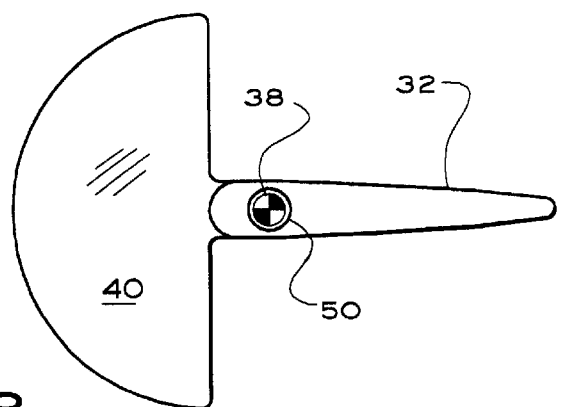
FIG. 8 is a sectional view taken from FIG. 7 in the direction indicated by the arrows.

In order to minimize or eliminate the movements of the vane in response to the angle of tilt of the compartment 24 or bicycle 18 it is preferred that the vane 32 include a center of gravity 38 that is in alignment with the support means 22. To ensure the center of gravity 38 lies over the support means 22, a counterbalance weight 40 has been incorporated into the vane structure. One embodiment of the vane 32 having a generally rounded counterbalance weight has been illustrated in FIGS. 3, 5 and 6. In another embodiment of the invention, illustrated in FIGS. 7 and 8, the counterbalance weight 40' is of a generally flat shape. The flat shape of the counterbalance weight 40' provides a means for reducing any turbulent flow in the air entering the compartment 24.

Turning now to FIGS. 3–5, it will be understood that in a highly preferred embodiment of the invention the compartment 24 is part of a housing 42 that includes an upper compartment 44 and a lower compartment 46, which coincides with the compartment 24 as described above. The upper compartment 44 having a transparent cover 48 which allows the rider to view the needle 36. Thus, as shown on FIG. 3, the lower compartment surrounds the vane 32, while the upper compartment 44 encloses the vane orientation indicator means, which in the embodiment illustrated in FIG. 3 is the needle 36 which has been further illustrated in FIG. 4.

As illustrated in FIGS. 3, 4, 6 and 7, in a highly preferred embodiment of the invention the needle 36 is rigidly connected to the vane 32 be way of a support shaft 50. Thus, as shown in FIG. 3, in this embodiment the vane and needle 36 are rigidly joined together. This joined assembly allows the vane 32 and needle 36 to be pivotally supported in the housing 42 and providing a direct connection between the vane 32 and the needle 36.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. An indicator device for aiding a cyclist riding a bicycle in locating a desired location for drafting another cyclist and locating a wind direction near the other cyclist, the device comprising:
   a support adpted for mounting the indicator device to the bicycle;
   a housing having a pair of compartments, said housing being attached to said support;
   a vane having surfaces for alignment with the wind, the vane being pivotally supported by said housing within one of the compartments of the housing; and
   a vane orientation indicator, the vane orientation indicator being mounted on said housing in one of the compartments of said housing, so that the orientation of said vane relative to the bicycle is detected with reference to the vane orientation indicator.

2. An indicator device according to claim 1 wherein said vane includes a center of gravity, and said vane further comprises a wind alignment section and a counterbalance weight for positioning the center of gravity of said vane on said support, whereby rotation of said vane in response to a change in the position of said support is reduced.

3. An indicator device according to claim 1 wherein said vane and said vane orientation indicator are mechanically connected to one another.

4. An indicator device according to claim 1 wherein vane orientation indicator comprises an electronic display connected to the housing.

5. An indicator device according to claim 1 wherein said vane orientation indicator means comprises an indicator needle that is connected to said vane.

6. An indicator device according to claim 5 wherein said indicator needle is rigidly connected to said vane.

7. An indicator device according to claim 2 and further comprising a housing having an upper compartment and a lower compartment, the lower compartment surrounding said vane, said upper compartment enclosing said vane orientation indicator, and wherein said vane orientation indicator comprises an indicator needle is rigidly connected to said vane.

8. An indicator device for aiding cyclists in locating a desired alignment location for drafting another cyclist, the device comprising:
   a housing having an upper compartment and a lower compartment; said lower compartment permitting air flow through the lower compartment;
   a vane pivotally mounted within the lower compartment of said housing;
   an indicator needle for displaying the orientation of said vane relative to said housing, the indicator needle for displaying the orientation of said vane being in the upper compartment of said housing, so that the desired alignment location for drafting-other cyclists is indicated by said indicator needle for displaying the orientation of said vane.

9. An indicator device according to claim 8 wherein said vane is mounted on a support mounted against said housing, the vane including a center of gravity, and said vane further comprising a wind alignment section and a counterbalance weight for positioning the center of gravity of said vane on said support.

10. An indicator device according to claim 8 wherein the lower compartment surrounds said vane, and said indicator needle for displaying the orientation of said vane in said upper compartment is rigidly connected to said vane.

11. An indicator device according to claim 8 wherein said indicator needle for displaying the orientation of said vane in said upper compartment is an electronic display connected to means for detecting the orientation of said vane relative to said housing.

12. An indicator device according to claim 8 wherein said indicator needle for displaying the orientation of said vane comprises an indicator needle that is mechanically connected to said vane.

13. An indicator device according to claim 12 wherein said indicator needle and said vane are mounted on a common support shaft.

14. A method for creating a bicycle mounted drafting location indicator device for aiding cyclists in locating a desired alignment location for drafting another cyclist, the method comprising steps of:

provoding a housing having at least one compartment having an aperture for permitting air flow through the lower compartment;

providing a vane, and pivotally mounting the vane within the compartment of the housing;

providing an indicator needle for displaying the orientation of the vane relative to the housing;

indexing the position of the indicator needle relative to the vane;

mounting the housing on a bicycle, so that the desired alignment location for drafting other cyclists is indicated.

15. A method according to claim 14 and further comprising steps of mounting said vane on a support mounted on said housing, and the vane includes a center of gravity, the vane further comprising a wind alignment section and a counterbalance weight for positioning the center of gravity of said vane on said support.

16. A method according to claim 14 wherein the compartment surrounds the vane, and further comprising steps of mechanically connecting said needle to said vane.

17. A method according to claim 14 comprising steps of connecting said needle to said vane through a common shaft.

18. A method according to claim 17 and further comprising steps of supporting said needle and said vane from said common shaft.

19. A method according to claim 14 and further comprising providing an upper compartment and supporting the upper compartment from the bicycle.

20. A method according to claim 19 and further comprising steps of enclosing said needle within said upper compartment.

\* \* \* \* \*